United States Patent [19]

Nado et al.

[11] Patent Number: 4,746,828

[45] Date of Patent: May 24, 1988

[54] MOLDED ELECTRIC MOTOR HOUSING AND BRUSH HOLDER UNIT

[75] Inventors: Willard Nado, Trumbull; Robert Lockwood, Milford; John Sherman, Westport, all of Conn.

[73] Assignee: Electrolux Corporation, Stamford, Conn.

[21] Appl. No.: 12,786

[22] Filed: Feb. 9, 1987

[51] Int. Cl.$^4$ ............................................. H02K 5/16
[52] U.S. Cl. ......................................... 310/90; 310/71; 310/239
[58] Field of Search ........................... 310/71, 90, 239

[56] References Cited

U.S. PATENT DOCUMENTS

| | | |
|---|---|---|
| 2,987,639 | 6/1961 | Bayless et al. . |
| 3,445,705 | 5/1969 | Fuller et al. . |
| 3,656,018 | 4/1972 | Maher . |
| 3,711,907 | 1/1973 | Parrent . |
| 3,770,331 | 11/1973 | Sellers et al. . |
| 3,784,856 | 1/1974 | Preston . |
| 3,794,869 | 2/1974 | Apostoleris ............................ 310/90 |
| 3,875,436 | 4/1975 | MacFarland . |
| 4,048,530 | 9/1977 | Kaufman, Jr. ........................ 310/90 X |
| 4,074,158 | 2/1978 | Cole . |
| 4,074,162 | 2/1978 | Parzych . |
| 4,156,821 | 5/1979 | Kurome et al. ....................... 310/90 X |
| 4,266,155 | 5/1981 | Niemela . |
| 4,295,268 | 10/1981 | Punshon et al. ...................... 310/90 X |
| 4,322,647 | 3/1982 | Neroda .................................. 310/71 |
| 4,329,612 | 5/1982 | Averill . |
| 4,340,830 | 7/1982 | Hoyer-Ellefsen ................... 310/90 X |
| 4,342,929 | 8/1982 | Horne . |
| 4,355,250 | 10/1982 | Langdon . |
| 4,384,224 | 5/1983 | Spitler et al. . |
| 4,491,752 | 1/1985 | O'Hara et al. . |
| 4,504,754 | 3/1985 | Stone ..................................... 310/90 |
| 4,513,214 | 4/1985 | Dieringer . |
| 4,593,220 | 6/1986 | Cousins et al. ..................... 310/71 X |
| 4,613,781 | 9/1986 | Sanders ............................... 310/71 X |
| 4,677,329 | 6/1987 | Secoura ................................ 310/71 |

Primary Examiner—Mark O. Budd

[57] ABSTRACT

A motor housing and brush holder device is constructed, as by molding, in such a manner as not to require any machining operations subsequent to its being molded and assembled, and it can be molded of either conductive or nonconductive materials. The housing, in this case, is of nonconductive high impact strength material and is a single preformed molded piece. The housing includes an integrally molded generally cylindrical stepped bearing recess or pocket for the end of an armature shaft and brush holders spaced axially and radially of the bearing recess. The shape of the bearing and its keeper is unique as well as the brushes and associated structures and the manner in which they supply power to the windings of the stator field coils.

23 Claims, 3 Drawing Sheets

MOLDED ELECTRIC MOTOR HOUSING AND BRUSH HOLDER UNIT

BACKGROUND OF THE INVENTION

The invention is generally related to the art of small electric motors. Numerous types and variations of small electric motors have been constructed and include a fixed stator portion and a rotor or an armature portion which is provided with a contact surface such as a commutator and with brushes or the like for establishing electrical contact with the rotor. Brushes have been maintained in proper orientation in numerous different manners, and interconnections between brush leads and stator leads, in the case of wound stators, have been conducted in numerous ways. Connections between stator windings and brushes are conventionally made by (1) stripping the wire or lead ends and splicing them together, (2) crimping female quick-connect-disconnect terminals that cooperate with male contact members, and (3) screw-and-nut type interconnections. Brush holding structures have been constructed in various ways and typically include some type of mounting plate, through which a rotor shaft passes, made of an insulating material, and brush guide tubes, or boxes of conductive material. In recent years it has been proposed to mold end housing having brush holder structure from high temperature withstanding plastic material. The patents to MacFarland, U.S. Pat. No. 3,875,436; Spitler et al., U.S. Pat. No. 4,384,244; Horne, U.S. Pat. No. 4,342,929; Dieringer, U.S. Pat. No. 4,513,214; and O'Hara et al., U.S. Pat. No. 4,491,752, are fairly typical of the most recent development in this area. Other prior art brush holders are also shown by Maher, U.S. Pat. No. 3,656,018; Preston, U.S. Pat. No. 3,784,856; Parzych, U.S. Pat. No. 4,074,162; and Niemels, U.S. Pat. No. 4,266,155. Bearing arrangements are shown in Sellers et al., U.S. Pat. No. 3,770,331; Cole, U.S. Pat. No. 4,074,158; and Langdon, U.S. Pat. No. 4,355,250.

SUMMARY OF THE INVENTION

It is an object of the present invention to overcome the disadvantages of providing elongated wire leads connecting field coil terminals to brush connections and the associated labor expenses after assembly. Also, the present invention permits the automatic assembling of end housings of the motors whereby the field coil terminal and brush connection is automatically made as the housing is assembled with the remainder of the motor. The foregoing and other objects of the invention have been attained by providing a molded plastic combination motor end cap, housing or bracket, brush housings, and a bearing pocket for the commutator end (shaft) of the motor, hereinafter referred to as the "front" motor bracket or housing. It is also an object of the invention to provide a "rear" motor bracket supporting a bearing, a fan, and a fan cover of like plastic material. One major contribution to the art lies in the orientation of the brush connection contact terminal with the field coil terminals during assembly, thus eliminating wire leads and terminals of the customary arrangement when the "front" motor bracket is assembled with the remainder of the motor, and thus substantially reducing the expenses involved in this art field.

BRIEF DESCRIPTION OF THE VIEWS OF THE DRAWING

FIG. 3 is a view of the interior of an end housing or cap similar to the prior art of FIG. 1 showing the improvement thereover;

FIG. 7A is a cross-sectional view of the bearing keeper shown in FIGS. 6 and 7;

DETAILED DESCRIPTION

Figure 2:
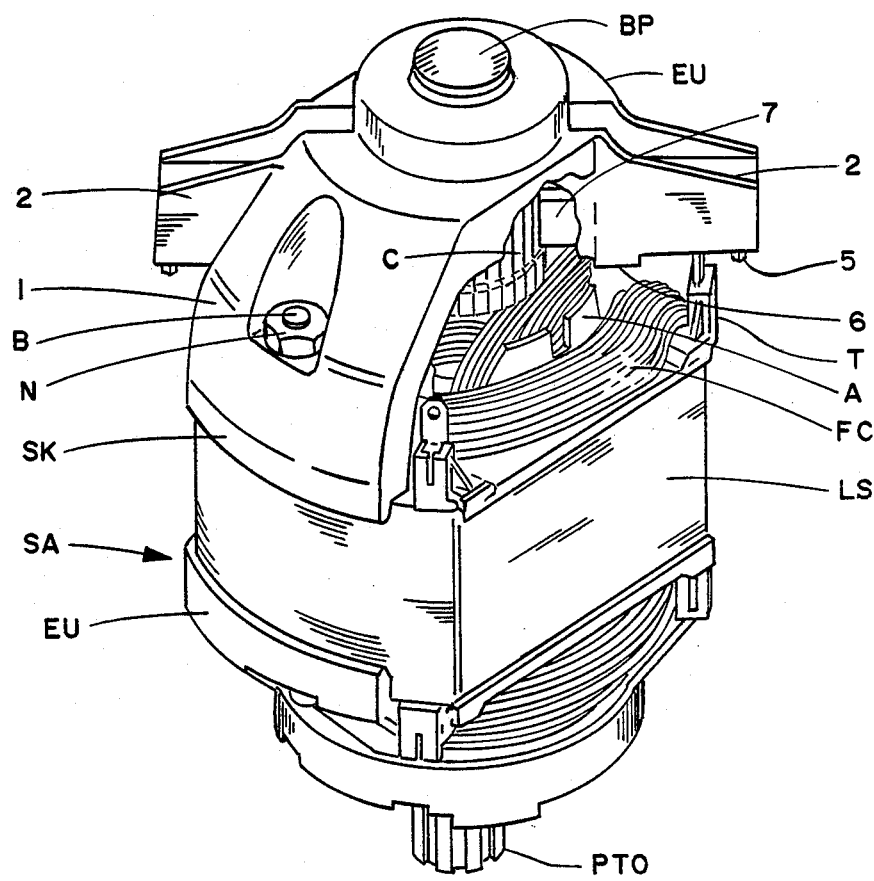
FIG. 2 is a perspective view of a small motor with the improved novel end housing or cap thereon.

As broadly illustrated in FIG. 2, the basic electric motor, insofar as this invention is concerned, includes a stator assembly SA with a conventional laminated stator stack LS carrying field coils FC, terminals T, an armature A, and a commutator C. Normally the armature has a shaft S, FIG. 6, which supports the commutator at an end thereof. The opposite end of the armature shaft projects beyond the armature and usually supports a conventional cooling fan and a power-take-off PTO asssembly. The ends of the shaft are also supported by bearings located in end units variously known as end housings, caps, brackets, etc., EU. The spaced housings etc. are normally fixed to the stator assembly and confine the stator and armature therebetween.

Figure 1:
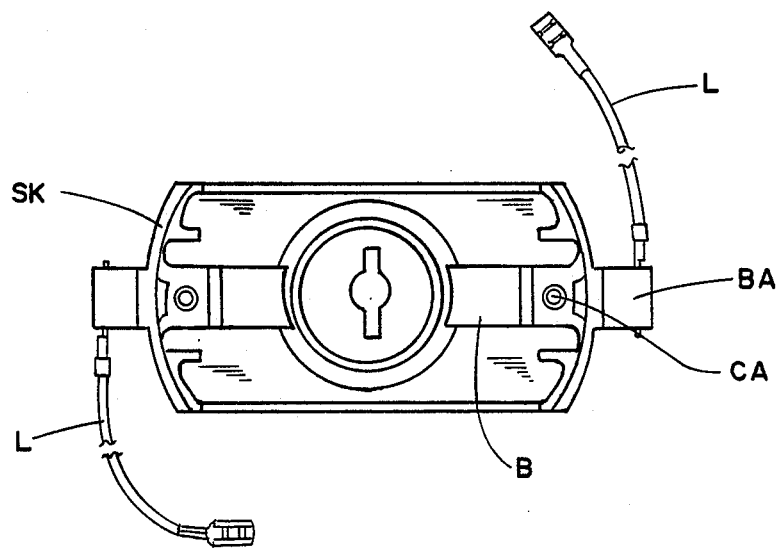
FIG. 1 is a view of the interior of an end housing or cap of a conventional prior art assembly showing leads, brushes, and armature shaft supporting structure.

The several novel features of the present invention are concerned with features of an end housing, cap etc. on the commutator end of the motor which electrically connect brush leads to leads of the stator field coils. As previously pointed out, the present invention is an improvement over that illustrated in FIG. 1 which shows elongated leads L which must be attached to the brush assembly BA as well as the field coils of the stator either before or after the end cap has been assembled with the remainder of the motor. It should also be noted that connecting aperture CA is located below and in alignment with brush assembly BA; e. g., presenting a blind aperture CA, thereby requiring the connection pin, bolt, screw, etc. to be inserted from the bottom housing end unit EU through the stator assembly into the blind connecting aperture. Fabricating the lead, assembling the same to the brush and stator coil terminal and attaching the housings to the stator assembly require substantial manual effort which obviously does not lend itself to automatic or robotic assembly.

Figure 5:
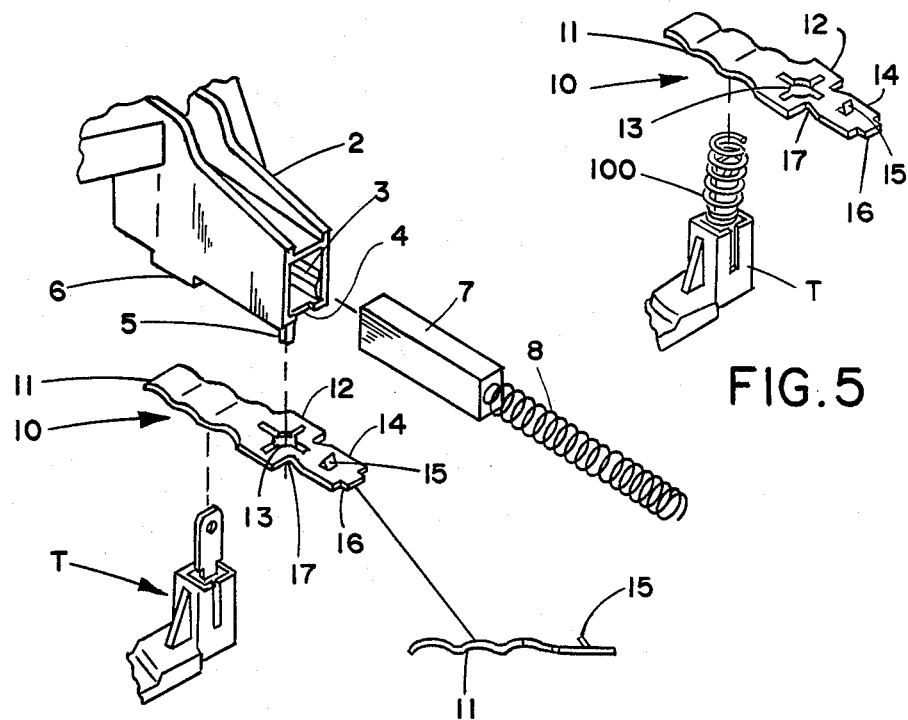
FIG. 5 is a view similar to that of FIG. 4 showing a modification thereof.
Figure 4:
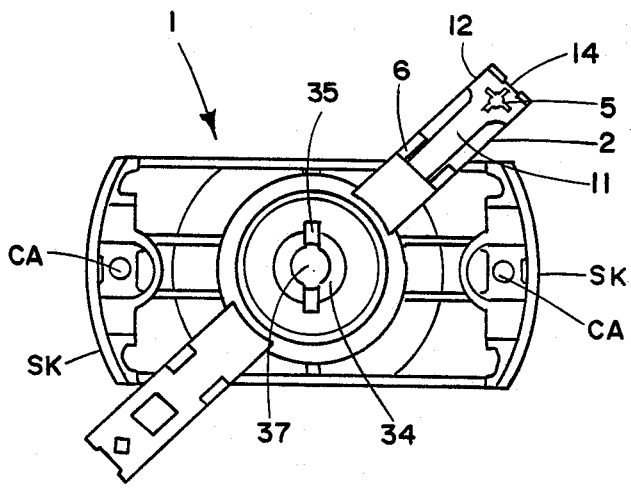
FIG. 4 is an exploded perspective view of the novel brush holder, contact terminal, and the field coil terminal employed in the motor of FIG. 2.

The present invention by its novel design lends itself to automatic assembly which eliminates all the above noted manual assembly and conserves substantial time, effort, and expense. As shown specifically in FIGS. 2 and 3, an end housing 1, which is of molded plastic construction and requires no machining, etc., has been designed to relocate brush holders 2 approximately 45°, as compared to the prior art shown in FIG. 1, in this case clockwise relative to stator engaging depending skirts SK, as shown in FIG. 2. In FIG. 3, a counterclockwise direction is shown since it is inverted as compared to FIG. 2. By relocating brush holders 2 relative to skirt SK, the elongated lead and its shortcomings relative thereto are eliminated. The elongated lead was necessary because the field coil terminal T was displaced or radially spaced from the brush holder BA, contact T, etc. By such relocation, the connecting apertures CA are out of alignment with brush holders 2 and such apertures can extend through skirts SK and thus define an arrangement whereby housing 1 can be assembled from the top via bolt B and nut N. This lends to automatic assembly of the housing 1 to the remainder of the motor. For example, the motor without housing 1 is conveyed to a work station with bolts B exposed, the housing 1 oriented with apertures CA aligned with bolts B is placed thereon, and nuts N are applied to complete the assembly. This new development of reorienting the brush holders 2 locates the same directly above the field coil terminal T, FIGS. 2 and 4. Each brush holder 2 is provided with an elongated cavity 3, a notch 4, a terminal retaining post 5, and terminal positioning shoulders 6, 6 as shown by FIGS. 2, 3, and 4. A commutator engaging brush 7 and conducting spring 8 are housed within cavity 3. In FIGS. 4 and 5, a contact terminal 10 for electrically connecting the commutator brush assembly to the stator coil terminal T is illustrated and includes a resilient, wavy or sine curve configuration end section 11, a midsection 12 having post gripping aperture 13 defined by resilient fingers or the like, a forward spring retaining end 14 having a brush spring confining tab 15, and a locking tab 16. The area between midsection 12 and the forward end 14 is a reduced area 17 adapted to be received in notch 4 of the brush holder 2 by first pressing post gripping fingered aperture 13 over the post 5 with a part of section 11 confined or located between spaced shoulders 6, 6, FIG. 4. Having attached conductive contact terminal 10 to the lower surface of holder 2, commutator brush 7 and conductive spring 8 are inserted into cavity 3. Retaining end 14 is then bent upwardly approximately 90° with reduced area 17 received in slot 4, and with spring retainer tab 15 engaging spring 8 and locking tab 16 pressed into cavity 3 and frictionally engaging the upper surface thereof. The end cap or housing is now ready to be assembled to the remainder of the motor. The structure as described above when assembled will automatically form an electrical connection between the armature's commutator and the stator's field coil terminal T as the resilient, wavy or sine curved portion 11 of contact terminal 10 is now in vertical alignment with terminal T and will be pressed thereagainst when the assembly is complete. The resilience of sine curve or wavy portion 11 of contact 10 maintains constant contact between same and terminal T.

A modification is illustrated in FIG. 5 for motors with varying spaces between brush housings and stator field coil terminals. All structural elements are the same as that described above except that a conductive coil spring 100 is provided to frictionally grip and extend beyond the upper end of the post of terminal T to engage the lower surface of contact terminal 10.

A further modification is illustrated in FIG. 5 for motors with varying spaces between brush housings and stator field coil terminals. All structural elements are the same as that described above except that a conductive coil spring 100 is provided to frictionally grip and extend beyond the upper end of the post of terminal T to engage the lower surface of contact terminal 10.

Figure 12:
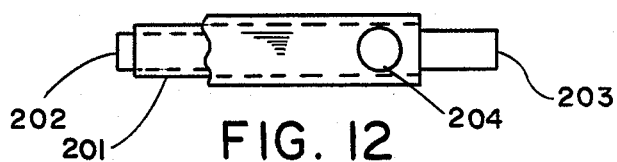
FIGS. 11 and 12 are similar to FIGS. 4 and 5 which show corresponding arrangements but of a larger or heavy-duty design.
Figure 8:
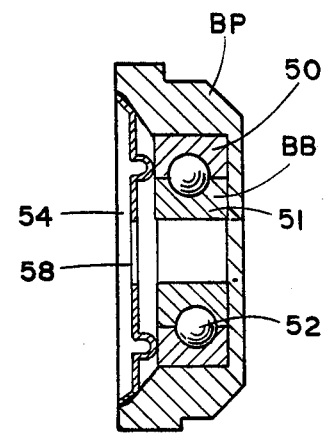
FIGS. 8 and 9 are views similar to those of FIGS. 6 and 7 illustrating a ball bearing.
Figure 11:
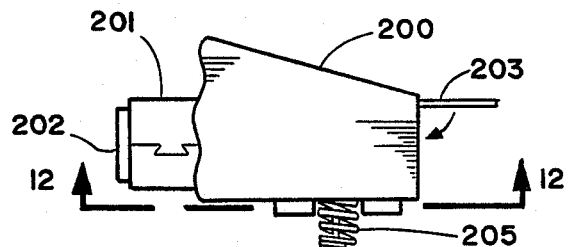
Figure 9:
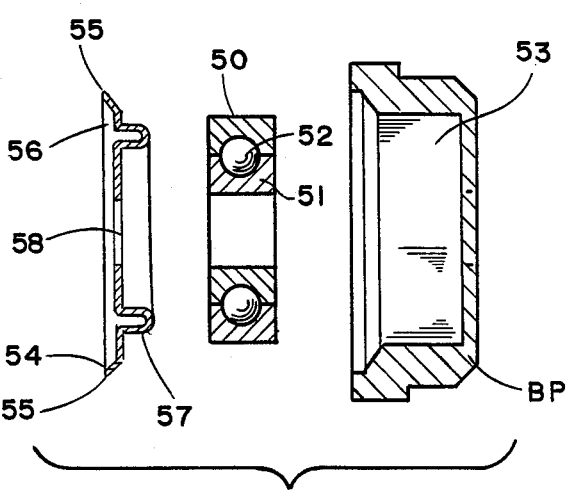

A further modification is illustrated in FIGS. 11 and 12 which also concerns the connecting of field coil terminals to brush connections without using elongated leads and terminals and specifically used in heavy-duty or larger motors. This connection is also automatically made during the assembly operation. As illustrated here, brush housing 200 has driven therein a tube 201 of brass or other conductive material providing a good tight friction fit, which tube provides a cavity for receiving a spring-biased commutator brush assembly 202. Tube 201 has a prong 203 at the rear thereof adapted to be bent downwardly to confine the brush assembly therein. The underside of housing 200 has an aperture 204 therein exposing an area of tube 201 to form a connection with a field coil terminal. A heavy conductive spring 205 is provided to make contact between tube 201 and the post of terminal T with the spring extending through aperture 204. As previously pointed out, as the end cap or housing is assembled with the remainder of the motor, the connection between the brush and field coil terminal is made as a result of such assembly, thereby eliminating the employment of the elongated lead, etc., and the necessary labor, expense, etc. connected therewith.

Figure 6:
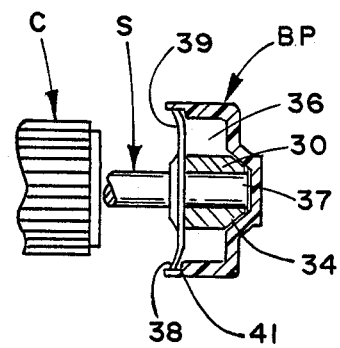
FIGS. 6 and 7 are views detailing features of the novel armature shaft supporting spherical bearing arrangement.
Figure 7:
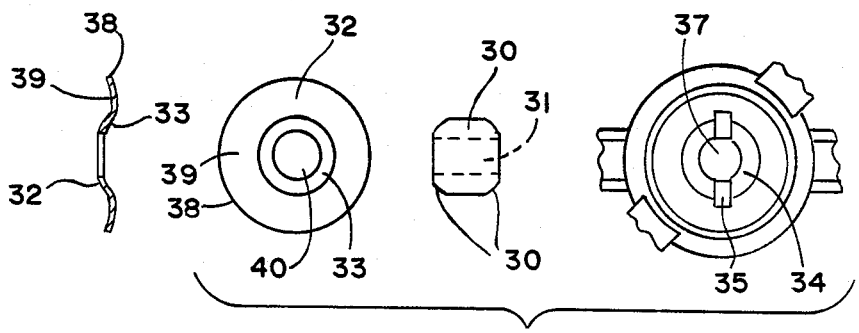
Figure 10:
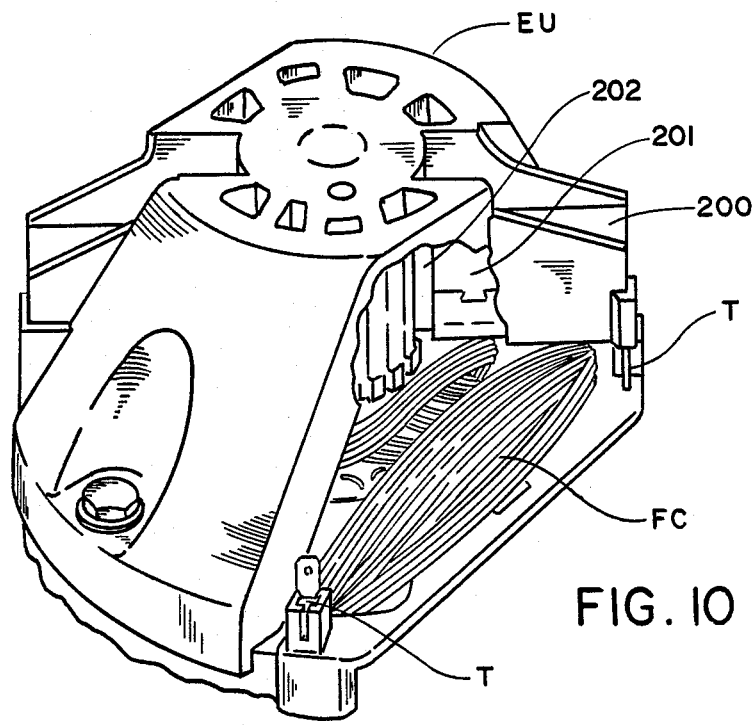
FIG. 10 is a view similar to FIG. 2 with the lower area removed showing a larger or heavy duty motor end cap or housing.

As noted above, another object of the invention is the provision of a unique bearing arrangement for the commutator end of the armature shaft. As illustrated in FIGS. 2, 3, and 6-9, a bearing pocket, cavity, recess, etc. BP is formed during the molding of the end housing, cap, or the like and requires no machining prior to the bearings being assembled therewith. In FIGS. 6 and 7 there is illustrated a spherical bearing arrangement which includes a bearing 30 having a shaft receiving aperture 31 and opposite, spherical, or convex ends 301 receivable respectively in corresponding concave-shaped sections of a keeper 32 and pocket BP. Concave surface 33 of keeper 32 receives and supports one end of bearing 30 while concave surface 34 of the bearing pocket receives and supports the other end when assembled. As shown in FIG. 7, lubrication slots 35 are provided in concave section 34 to permit lubrication to flow from relatively large cavity area 36 to shaft S through smaller cavity 37. The lubricant may be in the form of granules or liquid or any number of forms. The annular keeper 32 with its unique design or shape is a very critical part of the whole bearing assembly and includes the already mentioned concave area 33, a relatively sharp-edged locking lip 38, a slightly concaved surface 39 facing a direction opposite concave area 33, and a shaft receiving aperture 40. Surface 39, due to its location and shape, defines a spring or resilient section or area which allows keeper 33 to be pressed into the bearing pocket with the sharp edge of locking lip 38 digging into the inner circular or annular surface 41 of the bearing cavity. When assembled, FIG. 6, locking lip 38 also serves as a lubrication seal due to the fit between said lip and surface 41. Once the keeper is pressed into position, it is very difficult to remove since concave area 39 tends to expand lip 38 due to its tendency to straighten out or expand radially, thereby preventing any linear displacement. With this bearing arrangement there is no machining of the pocket or keeper. The pocket is formed during the molding process and the surfaces thereof are of such character as not to require machining or polishing thereof and the keeper is formed by a common punch-press or stamping operation.

The ball bearing assembly BB mentioned above is illustrated in FIGS. 8 and 9 and includes a fixed outer race 50, inner race 51 and ball bearings 52 therebetween. The bearing cavity or pocket BP encompasses outer race 50 of the ball bearing when the bearing assembly is pressed therein. A keeper 54 having a locking lip arrangement 55 and concave area 56, similar to that disclosed with respect to that illustrated in FIGS. 6 and 7 and described above, includes an annular projection or bead-like section 57 formed between the locking lip and a shaft receiving aperture 58 therein. This annular projection 57 engages the outer race 50 of the bearing and maintains same in position upon pressing the keeper 54 into position. Like the spherical bearing keeper, this ball bearing keeper digs into the concerned surface of the bearing cavity and forms a locking lip connection and a lubricating seal.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense. Therefore, while the illustrated and described details preferred embodiments of this invention, it is of course understood that various other modifications may be made therein, and it is intended to cover in the appended claims all such modifications as fall within the true spirit and scope of the invention.

What is claimed is:

1. In an electric motor having a stator assembly, a rotor or armature, spaced end housings or caps operatively connected to and supporting said stator assembly and said armature, said stator assembly including field coil winding and terminals attached thereto, the armature having a commutator at one end thereof; the improvement comprising the end housing supporting the commutator end of said armature including a molded, generally U-shaped, plastic construction defining a bight portion, spaced legs defining skirt-like portions, and generally opposed, elongated, open-ended, tubular brush holders, said bight portion, spaced legs and brush holders being of integral one-piece plastic construction, said brush holders extending generally radially outwardly from said bight portion thereof and circumferentially spaced relative to said skirt-like portions and in linear alignment with terminals of the field coil windings, a conductive spring biased brush assembly confined within each plastic brush holder and engageable with said commutator, conductive contact means supported by each plastic brush holder and including a first portion retaining a brush assembly in said brush holder, said contact means being in electrical communication with an adjacent brush assembly, said conductive contact means including a second portion in direct contact with an adjacent terminal of the field coil windings, thereby forming a leadless connection therebetween.

2. The improvement as recited in claim 1 wherein each said conductive contact means is of an elongated configuration attached to said brush holder said first portion bent upwardly to substantially cover an open end of said brush holder to engage and confine a brush assembly therein, said second portion being of a resilient, wavy or sine curve configuration to maintain constant engagement between same and an adjacent terminal of the field coil windings.

3. The improvement as recited in claim 2, wherein a portion of said conductive contact means intermediate said first and second portions includes means to secure same to a brush holder.

4. The improvement as defined in claim 1, wherein each brush holder includes an integral plastic projection or post and plural laterally spaced shoulders near an end portion thereof, and wherein the conductive contact means has located intermediate the ends thereof a post gripping resilient fingered aperture whereby when assembled the gripping aperture grips the post and said laterally spaced shoulders confines said contact means therebetween.

5. The improvement as defined in claim 1 wherein each field coil winding terminal defines a post with an elongated conductive coil spring thereon contacting said conductive contact means.

6. The improvement as recited in claim 1 wherein said conductive contact means includes a conductive sleeve secured within each said tubular, plastic brush holder within which a brush assembly is conductively confined.

7. The improvement as recited in claim 6 wherein each said tubular holder has an aperture therein in alignment with an adjacent field coil winding terminal and exposing a portion of said conductive sleeve.

8. The improvement as recited in claim 7 wherein said exposed portion of said sleeve defines a contact surface, a conductive coil spring positioned on an adjacent field coil winding terminal for extending through said aperture and into contact with said contact portion of said conductive sleeve.

9. The improvement as recited in claim 1 wherein said end housing supporting the commutator end of said armature further includes an elongated closed end bearing pocket, a bearing means having a shaft receiving aperture therein positioned within said bearing pocket, and a bearing keeper engaging said bearing means to confine said bearing means within said bearing pocket, said bearing keeper being of an annular configuration and defining an opening therein in alignment with said bearing means aperture, said bearing keeper having an outer circumferential surface defining a sharp-edged locking lip frictionally engaging the inner surface of said pocket.

10. The improvement as recited in claim 9 wherein said bearing keeper includes a concave annular section which merges into said sharp-edged locking lip, thereby defining a spring or resilient section to allow same to be pressed into said bearing pocket with said locking lip tending to bite the inner surface of said bearing pocket to confine said bearing means and form a lubricating seal.

11. The improvement as defined in claim 10, said bearing keeper including a second concave section intermediate said aperture and said first-mentioned concave section with said second and said first-mentioned concave sections facing in opposite directions, the closed end of said bearing pocket having a concave surface facing said second concave surface with said bearing means mating with and confined between said last-mentioned surfaces.

12. The improvement as defined in claim 11 wherein said bearing means is a member of spherical configuration.

13. The improvement as defined in claim 10 wherein said bearing means is a ball bearing having an outer fixed race and an inner race with balls therebetween.

14. The improvement as recited in claim 10 wherein said bearing keeper includes an annular rib intermediate said locking lip and said keeper aperture, and said bearing means having an outer fixed race, said annular rib engaging said fixed race.

15. An electrical motor end housing and brush holding unit including a molded plastic, one-piece structure defining spaced, generally parallel legs interconnected by a bight portion said bight portion including molded plastic surfaces defining a bearing pocket, said legs and said bight portion defining a generally U-shaped configuration, said legs being adapted to be attached to a stator means, said bight portion including molded plastic, generally elongated, open-ended tubular brush holders extending generally radially outwardly from said bight portion and circumferentially spaced relative to said legs, said legs, said bight portion and said brush holders being of integral plastic construction, each brush holder having a conductive spring-biased brush assembly, confined therein for engagement with a commutator, conductive contact means secured to each bush holer and connected to and in electrical communication with a brush assembly and defining means for directly contacting a field coil winding terminal of an electric motor.

16. The improvement as recited in claim 15 wherein said conductive contact means is of an elongated configuration attached to said brush holder and including a first portion extending over an open end of said tubular brush holder to engage and confine said spring-biased brush assembly, and a second portion being of a resilient wavy or sine curve configuration to maintain constant contact with a field coil winding terminal.

17. The improvement as recited in claim 16 wherein said brush holder has means for facilitating attachment of said conductive contact means thereto, said conductive contact means including a portion intermediate said first and second portions for securement to said brush holder means.

18. The improvement as defined in claim 17 wherein said brush holder means for securing said conductive contact means thereto includes a projection, said brush holder further including laterally spaced shoulders, said conductive contact means having portions defining a resilient fingered aperture for gripping said projection whereby, upon assembly, said gripping aperture retains said conductive contact means upon said projection, and said laterally spaced shoulders confine said conductive contact means therebetween.

19. The improvement as defined in claim 15, each said tubular brush holder having a conductive sleeve secured therein, said spring-biased brush assembly being conductively confined therein, said sleeve defining said conductive contact means.

20. The improvement as recited in claim 19 wherein each said tubular brush holder includes portions defining an aperture therein exposing portions of a conductive sleeve therein whereby a field coil winding terminal may electrically communicate with said conductive sleeve.

21. An electrical motor end housing having surfaces defining a pocket therein, an armature shaft support bearing positioned within said pocket, said pocket open end facing the armature of an electrical motor, said bearing having a shaft receiving aperture therein, keeper means engaging said bearing to confine the same within said pocket, said keeper means being of an annular configuration and including portions defining an opening therein in alignment with said bearing aperture, the outer circumferential edge surface of said annular keeper means defining a locking lip for frictionally engaging the inner surface of said end housing defining said pocket for confining said bearing in said pocket and forming a lubrication seal, said motor end housing being of molded plastic construction, said keeper means including a concave annular section which merges into said locking lip, thereby defining a spring or resilient section permitting said keeper means to be pressed into said pocket with said lip biting into said pocket defining surfaces, said keeper means further including a second concave section intermediate said aperture and said first-mentioned concave section, said concave sections facing in opposite directions, said surfaces defining said pocket and also defining a concave surface facing said second concave section, said bearing mating with and confined between said concave surface and said second concave section.

22. The improvement as recited in claim 21 wherein said bearing is of spherical configuration.

23. An electrical motor end housing having surfaces defining a pocket therein, an armature shaft support bearing positioned within said pocket, said pocket open end facing the armature of an electrical motor, said bearing having a shaft receiving aperture therein, keeper means engaging said bearing to confine said bearing within said pocket, said keeper means being of an annular configuration and including portions defining an opening therein in alignment with said bearing aperture, the outer circumferential edge surface of said annular keeper means defining a locking lip for frictionally engaging the inner surface of said end housing defining said pocket for confining said bearing in said pocket and forming a lubrication seal, said motor end housing being of molded plastic construction, said keeper means including an annular rib intermediate said lip and said aperture, said bearing being a ball bearing having a fixed outer race, said annular rib abutting said fixed race.

* * * * *